United States Patent
Norris et al.

(10) Patent No.: US 7,028,338 B1
(45) Date of Patent: Apr. 11, 2006

(54) SYSTEM, COMPUTER PROGRAM, AND METHOD OF COOPERATIVE RESPONSE TO THREAT TO DOMAIN SECURITY

(75) Inventors: James W. Norris, Kansas City, MO (US); John Everson, Kansas City, MO (US); Daniel LaMastres, Independence, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 850 days.

(21) Appl. No.: 10/023,558

(22) Filed: Dec. 18, 2001

(51) Int. Cl.
*G06F 11/34* (2006.01)

(52) U.S. Cl. .............................. 726/23; 713/188; 726/3

(58) Field of Classification Search ................ 713/188, 713/200, 201
See application file for complete search history.

(56) References Cited

U.S. PATENT DOCUMENTS

| | | | | |
|---|---|---|---|---|
| 5,991,881 A | * | 11/1999 | Conklin et al. ............. | 713/201 |
| 6,167,407 A | * | 12/2000 | Nachenberg et al. ....... | 707/203 |
| 6,349,311 B1 | * | 2/2002 | Sobel et al. ................ | 707/203 |
| 6,704,874 B1 | * | 3/2004 | Porras et al. ............... | 713/201 |
| 6,725,377 B1 | * | 4/2004 | Kouznetsov ................ | 713/201 |
| 6,738,911 B1 | * | 5/2004 | Hayes ........................ | 713/201 |
| 6,789,202 B1 | * | 9/2004 | Ko et al. .................... | 713/201 |
| 2003/0093692 A1 | * | 5/2003 | Porras ........................ | 713/201 |

* cited by examiner

*Primary Examiner*—Gregory Morse
*Assistant Examiner*—Thomas N. Szymanski

(57) ABSTRACT

A system, computer program, and method of providing an automatic cooperative response ability to all members of a domain in light of a detected threat or other suspicious activity, such as, for example, a virus or denial of service attack, directed, at least initially, at less than all members of the domain. The system broadly comprises the domain; a log server; a detection server; and a profile server. The domain comprises a logical grouping of members having similar risk profiles. The detection server monitors and parses log and audit records generated by the members and copied to the log server. When the detection server identifies threatening or other suspicious activity it sets an alert status in a security profile stored on the profile server. The members periodically query the profile server for updates to the alert status and are thereby apprised of the alert.

31 Claims, 4 Drawing Sheets

SYSTEM, COMPUTER PROGRAM, AND METHOD OF COOPERATIVE RESPONSE TO THREAT TO DOMAIN SECURITY

BACKGROUND OF THE INVENTION

1. Field of the Invention

The present invention relates to systems, computer programs, and methods of providing computer and network security. More particularly, the present invention relates to a system, computer program, and method of providing an automatic cooperative response ability to substantially all of a plurality of members of a domain in light of a detected threat or other suspicious activity.

2. Description of the Prior Art

It is often desirable in a host or network-based domain comprising a plurality members to provide security mechanisms operable to identify and respond to detected threats or other suspicious activity that indicate an attempt to compromise the domain's integrity. Threatening activity may include, for example, activity indicative of either a denial of service attack or brute force password testing and probing in an attempt to gain unauthorized access.

A variety of systems, computer programs, and methods of providing such security are known in the art. Host-based intrusion detection systems (IDSs), are known, for example, that attempt to identify threatening activity and generate a corresponding alert. Unfortunately, a separate instance of the IDS must reside on each member of the domain, which substantially negatively impacts each member's available processing, storage, and other computing resources. Furthermore, IDSs only communicate threatening activity without centrally logging it. Savvy attackers will delete or modify these logs after successfully gaining access to the member, thereby erasing and eliminating any record of the attack and the attacker's presence.

Additionally, when the IDS detects threatening activity, it merely communicates an alert to an administrator. The administrator must then determine and implement an appropriate response, possibly requiring that all IDS probes be separately reconfigured in order to increase security. If the network includes devices having different natures, values, or risk tolerances or members that are administratively or otherwise isolated, then valuable time may be lost while assessments are made, appropriate personnel contacted, and responses implemented.

Due to the above-identified and other problems and disadvantages in the art, a need exists for an improved system, computer program, or method for providing host-based or network-based domain security.

SUMMARY OF THE INVENTION

The present invention provides a distinct advance in the art of systems, computer programs, and methods of providing computer and network security. More particularly, the present invention concerns a system, computer program, and method of providing an automatic cooperative response ability to substantially all of a plurality of members of a domain in light of a detected threat or other suspicious activity, such as, for example, a virus or denial of service attack.

In a preferred embodiment, the system broadly comprises one or more instances of a Rainforest Agent; one or more log servers; one or more detection servers; and one or more profile servers. The aforementioned domain is defined as a logical grouping of the members based upon similar risk profiles, determined by such factors or member characteristics as, for example, the members' nature, use, value, and risk tolerance. The member may be devices or objects, including, for example, servers, mainframes, and personal computers, and need not necessarily be on the same network or in direct contact with or even geographically near one another. Each member generates log and audit records containing information related to the use and attempted use of the member. Each member is provided with its own separate instance of the Rainforest Agent and a Rainforest configuration file, rainforest.cfg. The Rainforest configuration file tells the Rainforest Agent to which domain the member belongs, to which log server to send log and audit records, and which profile server to periodically query for updates to a security profile.

The log, detection, and profile servers are dedicated devices protectively located behind a firewall. Thus, security provided by the present invention is administered from a protected position rather than from the exposed members subject to attack. The log server receives and stores in a database all log and audit records generated and sent by the members. The detection server monitors and parses through this stored information using a threat-detection logic in order to identify threatening activity. When the detection server identifies such activity in the logs of a particular member, it changes an alert status component of the security profile located on the profile server. All Rainforest Agents periodically query the security profile and thereby learn of the threat. Each such alert comes with an expiration time after which, if no additional action is taken, the security profile returns to normal.

The largest portion of the computer program, other than the Rainforest Agent and the Rainforest configuration file, resides primarily or entirely on the log, detection, or profile servers. Thus, the present invention advantageously minimizes its impact on the members' processing, storage, and other computing resources, unlike existing host-based IDSs. Furthermore, the present invention advantageously logs all suspicious activity and then copies that information to the log server located behind the firewall. Thus, even though a successful attacker may delete all logs on the compromised member, the logs continue to exist in the log server as evidence of the attack. Additionally, when threatening activity is detected against a member of the domain, all other members of the domain are automatically protectively reconfigured by a change in the security profile which is located on the profile server and checked periodically by each member via their respective Rainforest Agents.

Additionally, the present invention is advantageously able to use a non-routable protocol, such as, for example, Netbios, to broadcast network-wide the detection of a threat. The non-routable protocol cannot pass out of its respective network, but Rainforest Agents can listen at firewall, router, or other edge devices and can act when they hear the broadcast. Such action might include, for example, a manually-resettable timed shutdown.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
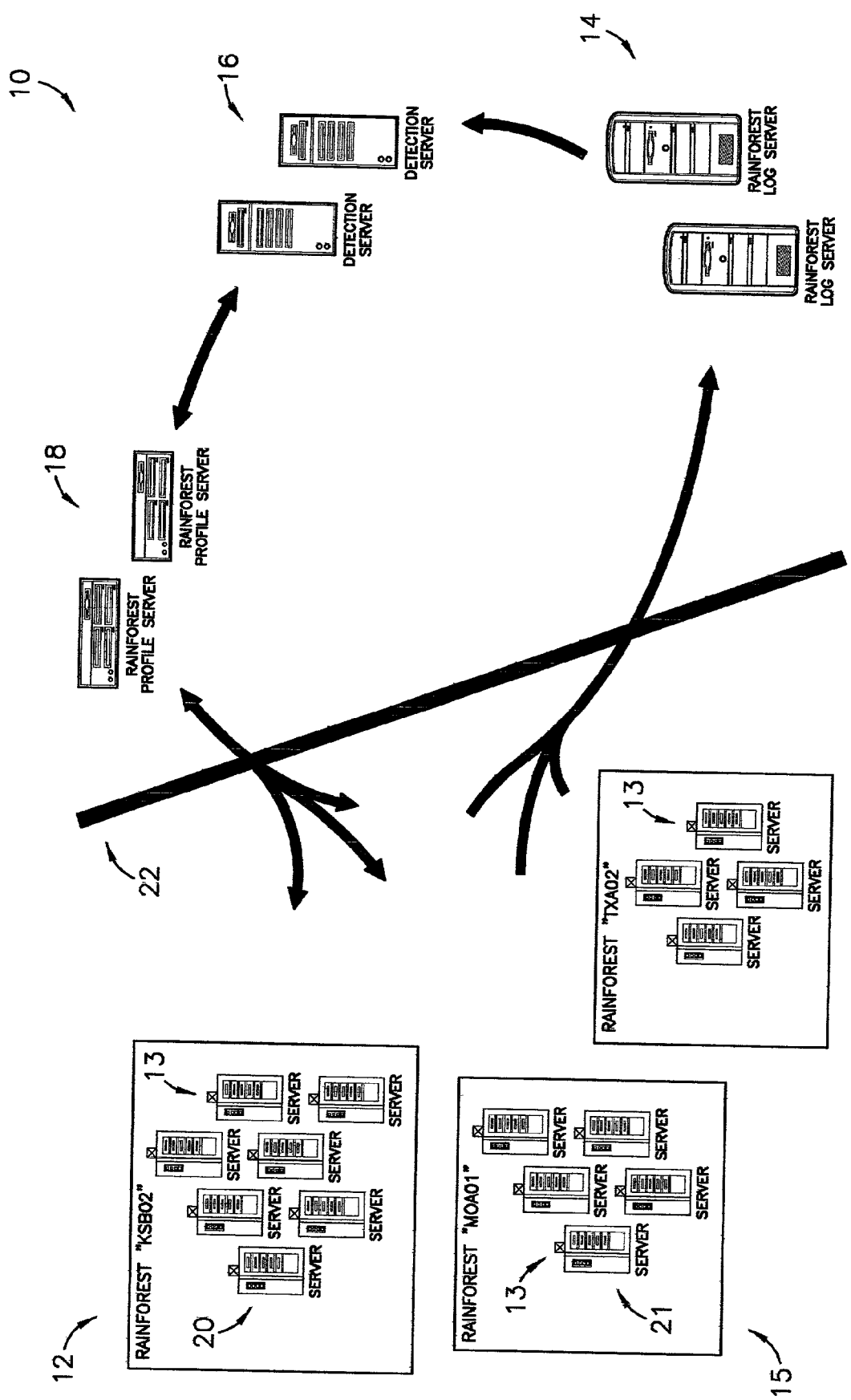
FIG. 1 is a depiction of a system used in a preferred embodiment of the present invention.

Referring to FIG. 1, a system 10 is shown constructed in accordance with a preferred embodiment of the present invention, and operable, in combination with a computer program described herein, to provide an automatic cooperative response ability in light of a detected threat or other suspicious activity.

It is well within the abilities of one with ordinary skill in the computer programming arts to create the computer program described herein. Thus, actual source code is not herewith provided. It will be appreciated, however, that the computer program broadly comprises a combination of code segments that may be written in any suitable programming language, such as, for example, Java or C++, and stored in or on any suitable computer-readable memory medium, such as, for example, a hard drive or compact disk, and executed by the system 10.

As illustrated, the system 10 is used to monitor one or more domains (hereinafter referred to as "Rainforests") 12, and broadly comprises one or more instances of a Rainforest Agent 13; one or more log servers 14; one or more detection servers 16; and one or more profile servers 18.

Each Rainforest 12 is a domain defined as a logical grouping of a plurality of members 20, wherein the logical grouping may be based on a variety of factors or member characteristics, including, for example, the members' nature, use, value, and risk tolerance. The members 20 may be any devices or edge devices or objects, including, for example, servers, mainframes, personal computers, firewalls, and routers, and need not necessarily be on the same network or in direct contact with or even geographically near one another. Each member 20 is operable to generate log and audit records containing information related to the use or attempted use of the member 20. With regard to the computer program of the present invention, each member 20 is provided only with its own separate instance of the Rainforest Agent 13 and a Rainforest configuration file, rainforest.cfg. By far the largest portion of the computer program resides on the log, detection, or profile servers, which advantageously minimizes any adverse impact on the members' processing, storage, and other computing resources.

The log, detection, and profile servers 14, 16, 18 are preferably dedicated devices located behind a firewall 22 so that the present invention is administered from a protected position rather than exposed to the very attacks it is meant to protect against. Each log server 14 is operable to receive the log and audit records from each member 20 assigned to it, and to database those records for future reference by the detection server 16.

The detection server 16 is operable to monitor the log and audit records of the members 20 it is assigned to protect. The detection server 16 parses through these records by applying a threat-detection logic to identify threatening activity. The threat-detection logic may be simple or complex, depending on a number of considerations, including the nature and value of the members 20. For example, in one possible threat-detection logic scheme, suspicious behaviors are associated with threat values, and when the sum of threat values for the domain exceed the Threshold Value 40, a threat is determined to exist. Thus, for example, where three members 20 report suspicious behavior, and the sum of the threat values assigned to these behaviors is "55", and the Threshold Value 40 is "50", then a threat is determined to exist.

Figure 2:
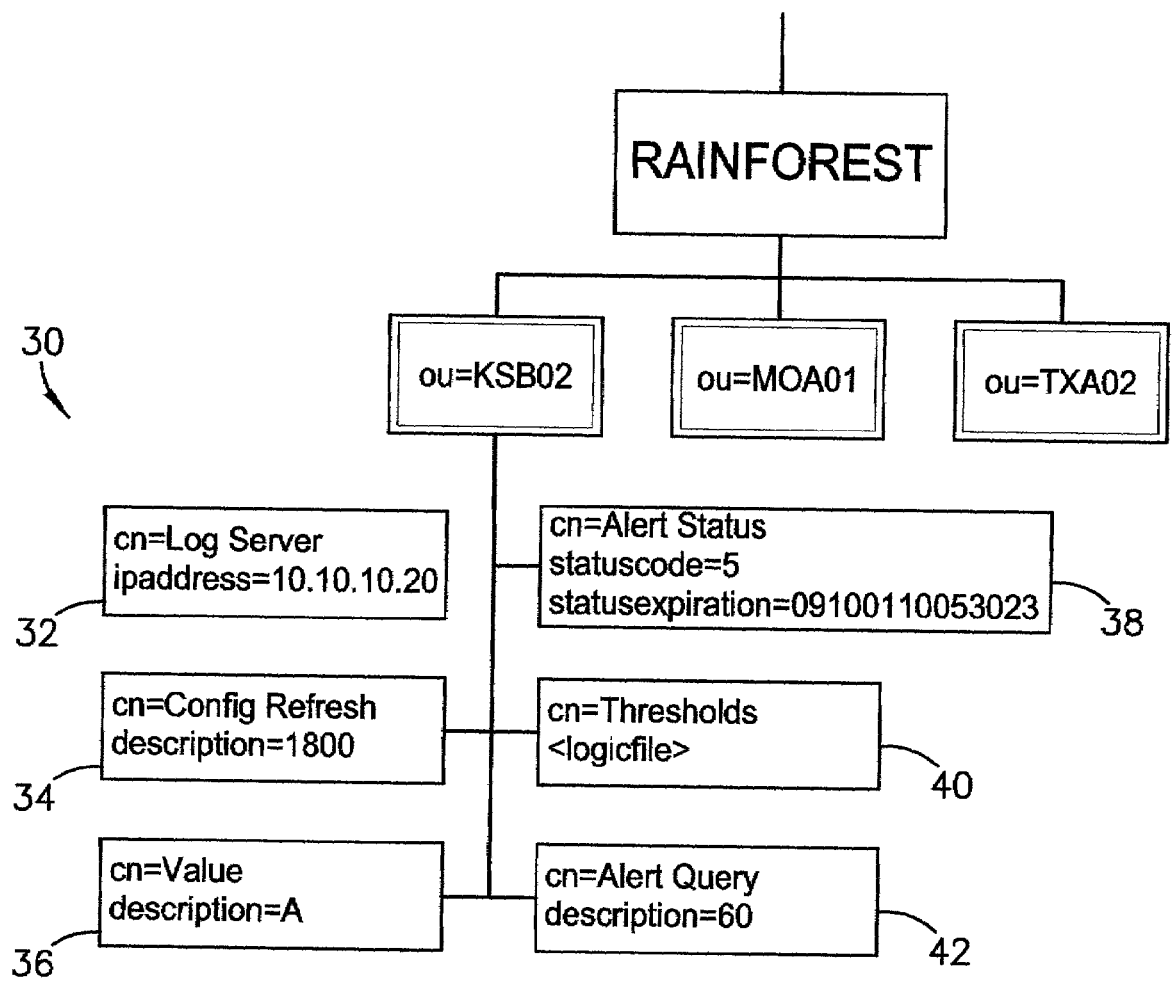
FIG. 2 is a tree diagram illustrating information in a security profile provided by a profile server component of the system shown in FIG. 1.

Referring also to FIG. 2, each profile server 18 is basically an X.500 directory with an LDAP front-end operable to provide a security profile 30 including a Log Server Address 32; a Configuration Refresh Frequency 34; a Device Value 36; an Alert Status 38; a Threshold Value 40; and an Alert Query Frequency 42. The Log Server Address 32 is an IP address read by all members 20 to determine which of potentially several log servers 14 to send all log and audit records to. The Configuration Refresh Frequency 34 is a frequency, measured in seconds, read by all members 20 to determine the frequency with which security profile updates are to be read from the profile server 18. The Device Value 36 is read only by the detection server 16 to determine the value assigned the members 20 of the domain 12, which determines the sensitivity level of the detection server's search for threatening or suspicious activity. The Alert Status 38 is read by all members 20 to determine the current threat level. The Threshold Value 40 is read only by the detection server 18 and is used in conjunction with threat-detection logic to determine when threats are detected. The Threshold Value 40 is directly related to the value of the members 20, with higher-valued members having a lower Threshold Value 40 to provide a higher threat sensitivity. The Alert Query Frequency 42 is read by all members 20 to determine how often, in seconds, to query the profile server 18 for updates to the Alert Status 38. The Log Server Address 32, Configuration Refresh Frequency 34, Device Value 36, Threshold Value 40, and Alert Query Frequency 42 are set manually by an Administrator. The Alert Status 38 is set automatically by the detection server 16.

It will be appreciated by those with ordinary skill in the relevant arts, that, under normal operating protocols, some or all peripheral devices in a network advertise their availability to the network via a non-routable protocol, such as, for example, Netbios. This ability is used by the present invention to cause the Rainforest Agents 13, in response to an alert, to broadcast network-wide via the non-routable protocol the detection of a threat and to tell all routers, firewalls, and other edge devices to tighten security and block traffic from particular networks or devices until the alert has expired. Furthermore, though the non-routable protocol cannot pass out of its respective network, other Rainforest Agents 13 can listen at the edge devices and can act when they hear the broadcast. Such action might include, for example, a manually-resettable timed shutdown.

Figure 3:
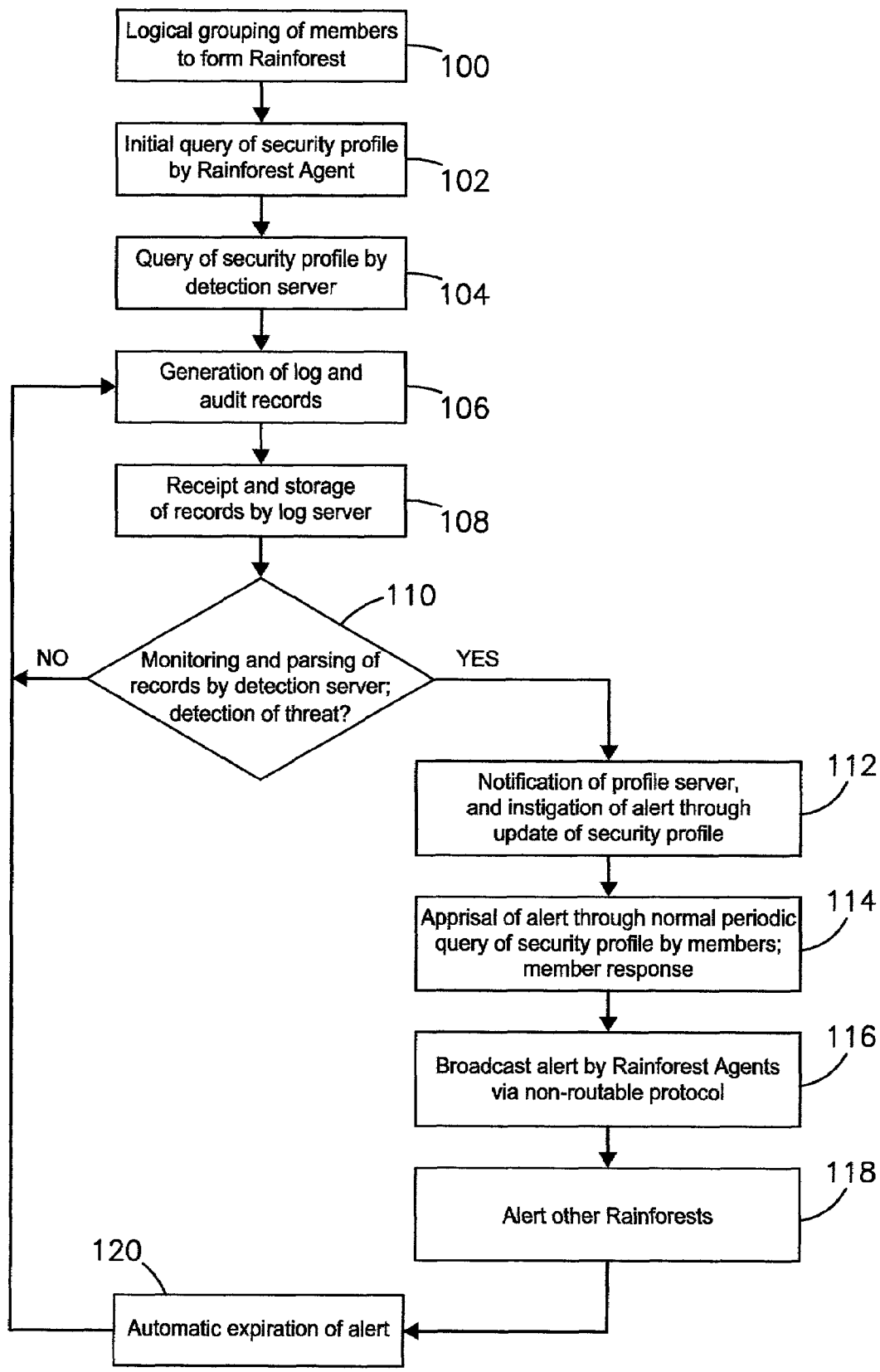
FIG. 3 is a block diagram illustrating operation of the system shown in FIG. 1.

In exemplary use and operation, referring to FIG. 3, the members 20 are logically grouped to form the Rainforest 12 after careful consideration of such factors as, for example, the members' nature, use, value, and risk tolerance, as depicted in box 100. Each member 20 is provided with its own separate instance of the Rainforest Agent 13 and the Rainforest configuration file, rainforest.cfg, which tells the Rainforest Agent 13 which Rainforest 12 the member 20 belongs to, which log server 14 to send its log and audit records to, and which profile server 18 to query for an updated security profile. Each Rainforest Agent 13 sends an initial query to the indicated profile server 18 in order to obtain the current security profile 30, as depicted in box 102. The detection server 16 also queries the security profile 30 to obtain the appropriate Device Value 36 and Threshold Value 40 on which to base determination of the presence of threatening activity, as depicted in box 104.

It will be appreciated that the present invention advantageously allows administrators to reconfigure security parameters for every member 20 of the domain 12 by merely changing an appropriate field in the security profile 30. Because each member 20 periodically queries the profile server 18 for an updated security profile 30, each member will be apprised of the reconfiguration. This is far more efficient than existing IDSs which typically require that each member be separately reconfigured.

During operation, each member 20 generates the log and audit records which contain information related to use and attempted use of the member, as depicted in box 106. The security profile 30 provides the Log Server Address 32 to which the log and audit records should be copied. The log server 14 receives and stores the log and audit records in a database, as depicted in box 108. Because the log server 14 is located behind the firewall 22, an attacker who successful gains access to a particular member 20 of the domain 12 is unable to delete the copied log and audit records of his or her entry.

The detection server 16 monitors and parses the copied log and audit records for signs of threatening or otherwise suspicious activity, as depicted in box 110. If no such threatening activity is detected, the Rainforest Agents 13 continue to copy their log and audit records to the log server 14.

Even if a particular member 20 logs threatening activity, such as, for example, one hundred failed login attempts, each associated with a date/time stamp, over a relatively short period of time, the member 20 is unable to recognize the threat or take action on its own, relying instead on the Alert Status 38 to tell it to take action. Thus, until an alert is issued, the member 20 will continue allowing login attempts. When the detection server 16 reads and parses the log file containing the one hundred failed login attempts and determines, based in part upon the Threshold Value 40 and the date/time stamps, that these failed login attempts constitute threatening activity, the detection server 16 responds by updating the Alert Status 38 stored in the profile server 18, as depicted in box 112.

With its next security profile query, each member 20 is apprised of the alert and responds accordingly, as depicted in box 114. Such response may take a variety of forms, including, for example, disallowing any network logins; requiring a user name and password to login; shutting down SMTP mail; or shutting down the member entirely. It will be appreciated that the nature of the response will depend greatly upon the nature and value of the member and of the domain.

Figure 4:
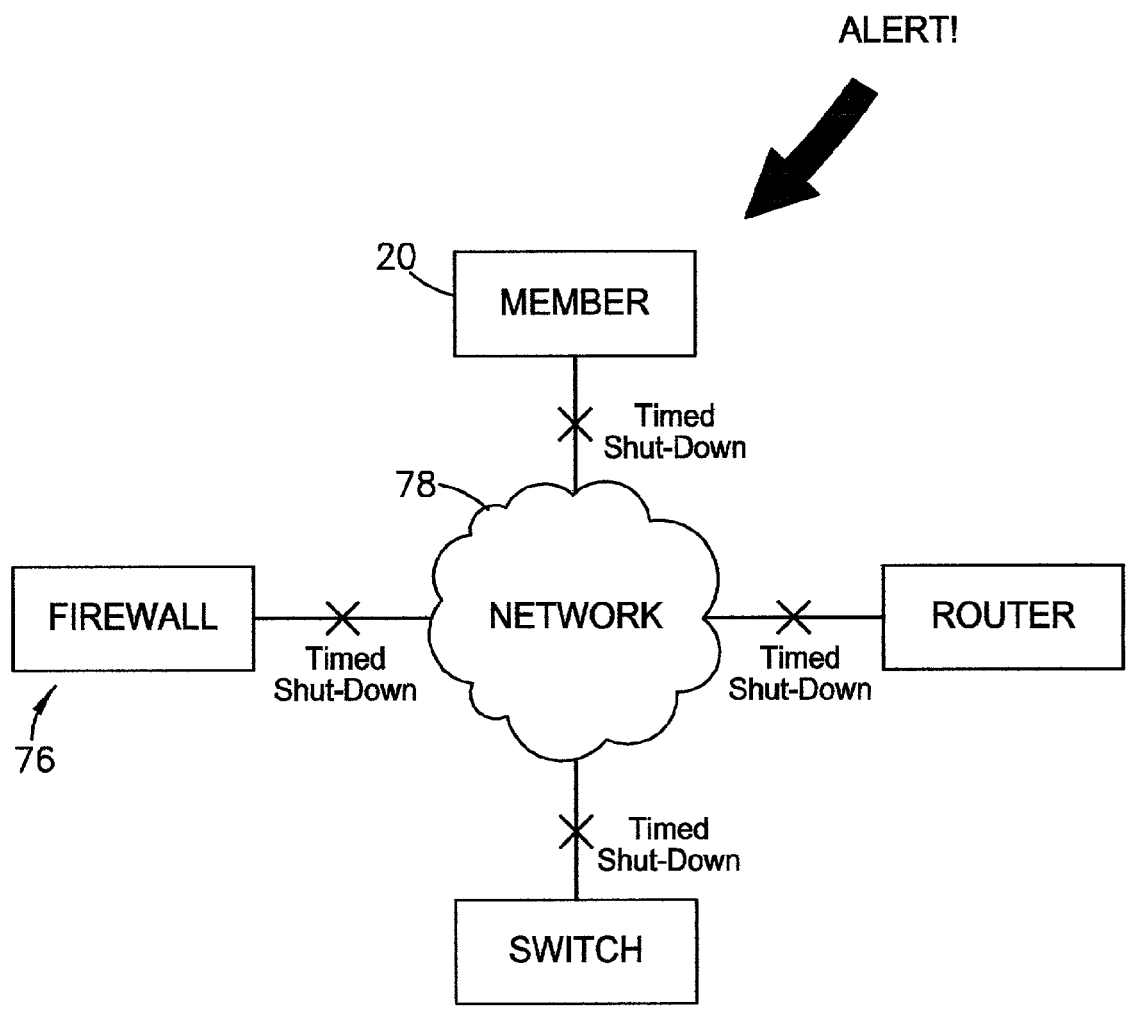
FIG. 4 is a block diagram illustrating operation of a network-wide broadcast capability of a preferred embodiment of the present invention.

Referring also to FIG. 4, the response may include the Rainforest Agents 13 sending a special broadcast message via a non-routable protocol, such as, for example, Netbios, as depicted in box 116, telling all routers, firewalls, and other edge devices 76 on the local network 78 to tighten security and block traffic from particular networks or devices until the alert has expired. Other Rainforest Agents 13 listening at these edge devices 76 will be apprised of the alert.

Additionally, referring again to FIG. 1, it will be appreciated that, just as the members 20 of the Rainforest 12 cooperate in their response to threatening activity, such cooperation may be implemented at a higher level as well. Thus, a threat detected within the Rainforest 12 may be communicated to and evaluated by a second Rainforest 15, possibly having higher value members 21, as depicted in box 118. The second Rainforest 15 may then preemptively issue an alert to its members 21 in light of a possible pending attack related to and evidenced by the detected attack on another Rainforest 12.

After a pre-defined period of time, the alert automatically expires and the security profile returns to its default non-alert configuration, as depicted in box 120.

From the preceding description, it can be appreciated that the system, computer program, and method of the present invention provide an automatic cooperative response ability to all of the members 20 of the Rainforest 12 in light of a detected threat or other suspicious activity directed, at least initially, at less than all of the members 20 of the Rainforest 12. It will further be appreciated that the present invention provides a number of advantages over the prior art, including minimized impact on the members' processing storage, and other computing resources; copied and protectively stored log and audit records; automatic initiation by all members of a response to a detected threat; single point reconfiguration of all members' security profiles 30; and novel use of the non-routable protocol broadcast security alerts.

Although the invention has been described with reference to the preferred embodiments illustrated in the attached drawings, it is noted that equivalents may be employed and substitutions made herein without departing from the scope of the invention as recited in the claims. For example, as mentioned, any practical number of Rainforests 12 having any practical number of members 20 may be serviced by any practical number of one or more log, detection, and profile servers 14,16,18.

Having thus described the preferred embodiment of the invention, what is claimed as new and desired to be protected by Letters Patent includes the following:

1. A system for facilitating a cooperative response by a plurality of members of a domain to a threat condition, with each of the plurality of members being operable to generate log records relating to the use and attempted use of the respective member, the system comprising:
   a log server operable to receive and store the log records of the plurality of members;
   a detection server operable to access the log server and parse the stored log records in identifying an occurrence of the threat condition in any of the plurality of members; and
   a profile server operable to store an alert status indicative of identification of the occurrence of the threat condition by the detection server,
   wherein each of the plurality of members is operable to query the profile server in order to check an alert status, and, in response to an alert, to implement a pre-defined action.

2. The system as set forth in claim 1, wherein the domain is defined as a logical grouping of the plurality of members which are not necessarily otherwise related.

3. The system as set forth in claim 2, wherein the logical grouping is based upon a value characteristic and a risk tolerance characteristic of each of the plurality of members.

4. The system as set forth in claim 1, wherein the detection server applies a threat-detection logic in conjunction with a pre-established threshold value in identifying the occurrence of the threat condition.

5. The system as set forth in claim 1, wherein the profile server is operable to provide a security profile including— a log server IP address operable to identify the log server to which each of the plurality of members should send the log records;

a configuration refresh frequency operable to a define a frequency at which to query the profile server for an update of the security profile;

a device value operable to define a value of each of the plurality of members, wherein the device value is used by the detection server when identifying the occurrence of the threat condition;

a threshold value operable in conjunction with a threat detection logic used by the detection server in identifying the occurrence of the threat condition; and an alert query frequency operable to define a frequency at which to query the profile server for an update of the alert status.

6. The system as set forth in claim 1, wherein the alert automatically expires, if no additional action is taken, after a pre-defined period of time.

7. The system as set forth in claim 1, wherein the plurality of members are operable to send via a non-routable protocol a broadcast message communicating the occurrence of the threat condition to an edge device.

8. The system as set forth in claim 1, wherein the occurrence of the threat condition is communicated to a second domain for evaluation and possible pre-emptive action.

9. A system for facilitating a cooperative response by a plurality of members of a domain to a threat condition, with each of the plurality of members being operable to generate log records relating to the use and attempted use of the respective member, the system comprising:

a log server operable to receive and store the log records of the plurality of members;

a detection server operable to access the log server and parse the stored log records in identifying an occurrence of the threat condition in any of the plurality of members;

a profile server operable to store an alert status indicative of identification of the occurrence of the threat condition by the detection server, wherein each of the plurality of members are operable to query the profile server in order to check the alert status, and, in response to an alert, to implement a pre-defined response, and further operable to send via a non-routable protocol a broadcast message communicating the occurrence of the threat condition to an edge device; and a protective firewall interposed between the domain and the log server, detection server, and profile server.

10. The system as set forth in claim 9, wherein the domain is defined as a logical grouping of the plurality of members which are not necessarily otherwise related.

11. The system as set forth in claim 10, wherein the logical grouping is based upon a value characteristic and a risk tolerance characteristic of each of the plurality of members.

12. The system as set forth in claim 9, wherein the detection server applies a threat-detection logic in conjunction with a pre-established threshold value in identifying the occurrence of the threat condition.

13. The system as set forth in claim 9, wherein the profile server is operable to provide a security profile including— a log server IP address operable to identify the log server to which each of the plurality of members should send the log records;

a configuration refresh frequency operable to a define a frequency at which to query the profile server for an update of the security profile;

a device value operable to define a value of each of the plurality of members, wherein the device value is used by the detection server in identifying the occurrence of the threat condition;

a threshold value operable in conjunction with a threat detection logic used by the detection server in identifying the occurrence of the threat condition; and an alert query frequency operable to define a frequency at which to query the profile server for an update of the alert status.

14. The system as set forth in claim 9, wherein the alert automatically expires, if no additional action is taken, after a pre-defined period of time.

15. The system as set forth in claim 9, wherein the occurrence of the threat condition is communicated to a second domain for evaluation and possible pre-emptive action.

16. A computer program for facilitating a cooperative response by a plurality of members of a domain to a detected threat condition, with each of the plurality of members being operable to generate log records relating to the use and attempted use of the respective member, the computer program comprising:

a code segment operable in the plurality of members to copy the log records to a remote location;

a code segment operable in the remote location to receive and store the log records;

a code segment operable in the remote location to parse the stored log records in identifying an occurrence of the threat condition;

a code segment operable in the remote location to set an alert status indicative of identification of the occurrence of the threat condition; and a code segment operable in the plurality of members to periodically query the alert status, and, in response to an alert, to implement a pre-defined action.

17. The computer program as set forth in claim 16, wherein the domain is defined as a logical grouping of the plurality of members which are not necessarily otherwise related.

18. The computer program as set forth in claim 17, wherein the logical grouping is based upon a value characteristic and a risk tolerance characteristic of each of the plurality of members.

19. The computer program as set forth in claim 16, wherein the code segment parsing the stored log records applies a threat-detection logic in conjunction with a pre-established threshold value in identifying the occurrence of the threat condition.

20. The computer program as set forth in claim 16, further comprising a code segment operable to provide to the plurality of members a security profile including— a log server IP address operable to identify the remote location to which the log records are to be copied;

a configuration refresh frequency operable to a define a frequency at which the security profile should be queried;

a device value operable to define the value of the plurality of members, wherein the device value is used in identifying the occurrence of the threat condition;

a threshold value operable to define a logic to be used in identifying the occurrence of the threat condition; and an alert query frequency operable to define a frequency at which to query the alert status.

21. The computer program as set forth in claim 16, wherein the alert automatically expires, if no additional action is taken, after a pre-defined period of time.

22. The computer program as set forth in claim 16, further including a code segment operable to send via a non-routable protocol a broadcast message to an edge device communicating the occurrence of the threat condition.

23. The computer program as set forth in claim 16, further including a code segment operable to communicate the occurrence of the threat condition to a second domain for evaluation and possible pre-emptive action.

24. A method of facilitating a cooperative response by a plurality of members of a domain to a threat condition, with each of the plurality of members being operable to generate log records relating to the use and attempted use of the respective member, the method comprising the steps of:
   (a) receiving and storing copies of the log records of the plurality of members in a remote location;
   (b) parsing the stored log records in the remote location in identifying an occurrence of the threat condition in any of the plurality of members;
   (c) setting an alert status in the remote location indicative of identification of the occurrence of the threat condition; and
   (d) the plurality of members periodically querying the alert status, and, in response to an alert, implementing a pre-defined action.

25. The method as set forth in claim 24, wherein the domain is defined as a logical grouping of the plurality of members which are not necessarily otherwise related.

26. The method as set forth in claim 25, wherein the logical grouping is based upon a value characteristic and a risk tolerance characteristic of each of the plurality of members.

27. The method as set forth in claim 24, wherein the occurrence of the threat condition is identified by use of a threat-detection logic in conjunction with a pre-established threshold value.

28. The method as set forth in claim 24, further comprising the step of (e) providing to the plurality of members a security profile including—
   a log server IP address operable to identify the remote location to which the log records are to be copied;
   a configuration refresh frequency operable to a define a frequency at which the security profile should be queried;
   a device value operable to define the value of the plurality of members, wherein the device value is used in identifying the occurrence of the threat condition;
   a threshold value operable to define a logic to be used in identifying the occurrence of the threat condition; and
   an alert query frequency operable to define a frequency at which to query the alert status.

29. The method as set forth in claim 24, further comprising the step of (e) terminating the alert automatically, if no additional action is taken, after a pre-defined period of time.

30. The method as set forth in claim 24, further including the step of (e) allowing the plurality of members to send via a non-routable protocol a broadcast message to an edge device communicating the occurrence of the threat condition.

31. The method as set forth in claim 24, further comprising the step of (e) communicating the occurrence of the threat condition to a second domain for evaluation and possible pre-emptive action.

* * * * *